United States Patent
Tur et al.

(10) Patent No.: US 10,036,686 B2
(45) Date of Patent: Jul. 31, 2018

(54) METHOD AND SYSTEM FOR AN ULTIMATELY FAST FREQUENCY-SCANNING BRILLOUIN OPTICAL TIME DOMAIN ANALYZER

(71) Applicant: Ramot at Tel-Aviv University Ltd., Tel Aviv (IL)

(72) Inventors: Moshe Tur, Tel Aviv (IL); Ido Sovran, Ramat Gan (IL); Avi Motil, Azor (IL)

(73) Assignee: Ramot at Tel-Aviv University Ltd., Tel Aviv (IL)

( * ) Notice: Subject to any disclaimer, the term of this patent is extended or adjusted under 35 U.S.C. 154(b) by 0 days.

(21) Appl. No.: 15/077,264

(22) Filed: Mar. 22, 2016

(65) Prior Publication Data

US 2016/0273998 A1    Sep. 22, 2016

Related U.S. Application Data

(60) Provisional application No. 62/136,534, filed on Mar. 22, 2015.

(51) Int. Cl.
*G01N 21/00* (2006.01)
*G01M 11/00* (2006.01)

(52) U.S. Cl.
CPC .......... *G01M 11/39* (2013.01); *G01M 11/319* (2013.01)

(58) Field of Classification Search
CPC ..................... G01M 11/3127; G01M 11/3172
(Continued)

(56) References Cited

U.S. PATENT DOCUMENTS

| | | | |
|---|---|---|---|
| 6,396,575 B1 * | 5/2002 | Holland | G01M 11/3181 356/73.1 |
| 2002/0122169 A1 * | 9/2002 | Lee | G01M 11/319 356/73.1 |

(Continued)

OTHER PUBLICATIONS

Javier Urricelqui et al.: "Polarization Diversity Scheme for BOTDA Sensors Based on a Double Orthogonal Pump Interaction"; Journal of Lightwave Technology, vol. 33, No. 12, June 15, 2015; pp. 2633-2638.

(Continued)

*Primary Examiner* — Sunghee Y Gray
(74) *Attorney, Agent, or Firm* — Pearl Cohen Zedek Latzer Baratz LLP

(57) ABSTRACT

A method and a system for ultimately fast frequency-scanning Brillouin optical time domain analysis are provided herein. The method may include: simultaneously launching two pairs each having a pulsed pump wave and a counter-propagating constant wave (CW) probe wave, into an optical fiber, wherein the pulsed pumps have orthogonal States of Polarization (SOPs), and wherein the two CW probe waves have a same SOP; scanning common pump-probe frequency difference, over a frequency range that encompasses a respective Brillouin Gain Spectrum (BGS) and current and expected spectral shifts of the BGS along the optical fiber; deriving, a local Brillouin Frequency Shift (BFS), in a distributed manner along the optical fiber, which is defined as the pump-probe frequency difference which maximizes the Brillouin gain on the BGS; and determining strain and/or temperature in a distributed manner along the optical fiber, based on the respective local BFS.

4 Claims, 4 Drawing Sheets
(3 of 4 Drawing Sheet(s) Filed in Color)

(58) Field of Classification Search
USPC .......................................................... 356/73.1
See application file for complete search history.

(56) References Cited

U.S. PATENT DOCUMENTS

| | | | | |
|---|---|---|---|---|
| 2013/0025374 A1* | 1/2013 | Voskoboinik | ...... | G01D 5/35303 73/655 |
| 2013/0308682 A1* | 11/2013 | Tur | ..................... | G01D 5/35303 374/161 |
| 2014/0022536 A1* | 1/2014 | Peled | ................. | G01M 11/3172 356/73.1 |

OTHER PUBLICATIONS

Alexia Lopez-Gil et al.: "Simple Method for the Elimination of Polarization Noise in BOTDA Using Balanced Detection and Orthogonal Probe Sidebands"; Journal of Lightwave Technology, vol. 33, No. 12, Jun. 15, 2015; pp. 2605-2610.

* cited by examiner ns of the present invention.

METHOD AND SYSTEM FOR AN ULTIMATELY FAST FREQUENCY-SCANNING BRILLOUIN OPTICAL TIME DOMAIN ANALYZER

CROSS REFERENCE TO RELATED APPLICATIONS

This application claims the benefit of U.S. Provisional Patent Application No. 62/136,534, filed on Mar. 22, 2015, which is incorporated herein by reference.

FIELD OF THE INVENTION

Some embodiments of the present invention relate generally to the field of Brillouin optical time-domain analysis, and more particularly to such analysis which is polarization-independent.

BACKGROUND OF THE INVENTION

Brillouin Optical time Domain Analysis (BOTDA) has proven its ability to measure strain and temperature, in a distributed manner, over tens of kilometers of optical fibers. Most often the optical frequency of a constant wave (CW) probe is scanned against that of a counter-propagating pulsed pump to recover Brillouin Gain Spectrum (BGS). The strain/temperature of the interrogated fiber segment is uniquely related to the local Brillouin Frequency Shift (BFS), defined as the pump-probe frequency difference which maximizes the Brillouin gain. Normally designed to cover long to very long ranges, classical implementations of BOTDA are slow, limiting them to quasi-static scenarios.

Four main factors control the sensing speed of a BOTDA setup: (i) the round-trip time of flight through the fiber under test (FUT), which limits pump pulse repetition rate; (ii) the granularity of the frequency scanning, which affects the measurement resolution and accuracy; (iii) the switching speed of the optical frequency scanning mechanism; (While on the order of milliseconds in classical BOTDA setups, this factor was practically eliminated by the Fast BOTDA (F-BOTDA) method, disclosed in US Patent Publication No. US20140022536A1 which is incorporated herein in its entirety. The F-BOTDA method enables an almost instantaneous (nanoseconds) frequency transitions.) and (iv) the number of averaging.

The first two factors impose an ultimate bound on the speed by which a BOTDA acquires a single BGS. The last factor deals with averaging, which is normally needed for two reasons: (a) to improve the signal to noise ratio (SNR), which, however, may not be required for relatively short fibers (<1 km), where strong pump pulses provide high gains without giving rise to detrimental nonlinear optical effects; and (b) to overcome the inevitable 'polarization fading', a term referring to the fact that the Brillouin interaction depends on the degree of parallelism of the States of Polarization (SOPs) of the pump and probe. However, in a standard, weakly birefringent FUT, these two SOPs hover around each other, resulting in highly non-uniform gain along the FUT, and consequently, fiber segments with minimum gain and poor SNR. Most often, this problem is eliminated by scrambling the state of polarization (SOP) of one of the interacting waves and averaging the sensor readings over multiple pump pulses, until a sufficiently high SNR is recorded along the full length of the FUT. This process significantly slows down the BGS acquisition speed. An alternative solution to the polarization fading problem, which reduces the acquisition speed by only a factor of two, involves the use of a fast polarization switch, where two orthogonal SOPs are sequentially launched into the fiber, and the resulting readings added. Recently, several new techniques have been introduced to eliminate the polarization fading using polarization diversity.

A paper titled "Simple method for the elimination of polarization noise in BOTDA using balanced detection of orthogonally polarized Stokes and anti-Stokes probe sidebands" published in 23rd International Conference on Optical Fiber Sensors (2014) discloses frequency scanning BOTDA implementation in which two probes interacted with a single pump so that one experienced gain while the other loss. The two probes, of different frequencies, were made orthogonal by separating them using a Dense Wavelength Division Multiplexing (DWDM) coupler, having a mirror on one output port and a Faraday mirror on its other port.

Another paper titled "Polarization diversity for Brillouin distributed fiber sensors based on a double orthogonal pump" in 23rd International Conference on Optical Fiber Sensors (2014) discloses another technique which employs the phase of the complex BGS rather than its magnitude. This method does not use frequency scanning but rather a single frequency interrogation, by two pairs of pumps and probes. Orthogonality of the different frequencies pumps was obtained by passing them through a Differential Group Delay (DGD) module, which differentially transforms their (originally) same polarization into two orthogonal ones.

SUMMARY OF THE INVENTION

A method and a system for ultimately fast frequency-scanning Brillouin optical time domain analysis are provided herein. The method may include: simultaneously launching two pairs of optical signals, each pair having a pulsed pump wave and a counter-propagating constant wave (CW) probe wave, into an optical fiber, wherein the pulsed pumps have orthogonal States of Polarization (SOPs), and wherein the two CW probe waves have a same SOP; scanning common pump-probe frequency difference, over a frequency range that encompasses a respective Brillouin Gain Spectrum (BGS) and current and expected spectral shifts of the BGS along the optical fiber; deriving, a local Brillouin Frequency Shift (BFS), in a distributed manner along the optical fiber, which is defined as the pump-probe frequency difference which maximizes the Brillouin gain on the BGS; and determining strain and/or temperature in a distributed manner along the optical fiber, based on the respective local BFS.

Advantageously, some embodiments of the present invention provide a frequency scanning BOTDA technique that can cover arbitrarily wide dynamic ranges, not possible by slope-assisted methods. Combined with fast frequency switching and polarization diversity, as presented here, no averaging may be needed and the measurement time required to recover the BGS along the whole fiber length is limited only by the number of scanning frequencies. Thus, acquisition speeds of a few kHz may be achieved, being sufficient to many applications in structural health monitoring (SHM), as well as in other fields.

According to some embodiments of the present invention, a frequency scanning BOTDA is proposed and demonstrated. The technique employs fast frequency switching and polarization diversity using a DGD module, to achieve the ultimate possible measurement speed, in terms of number of full-fiber BGS per second, limited only by the round trip time of flight through the FUT and the number of interrogating frequencies. By way of a non-limiting example, for a 145 m long fiber and 61 such frequencies, the fiber's Brillouin profile can be distributively captured at a measurement rate of 11,300 BGS/sec.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
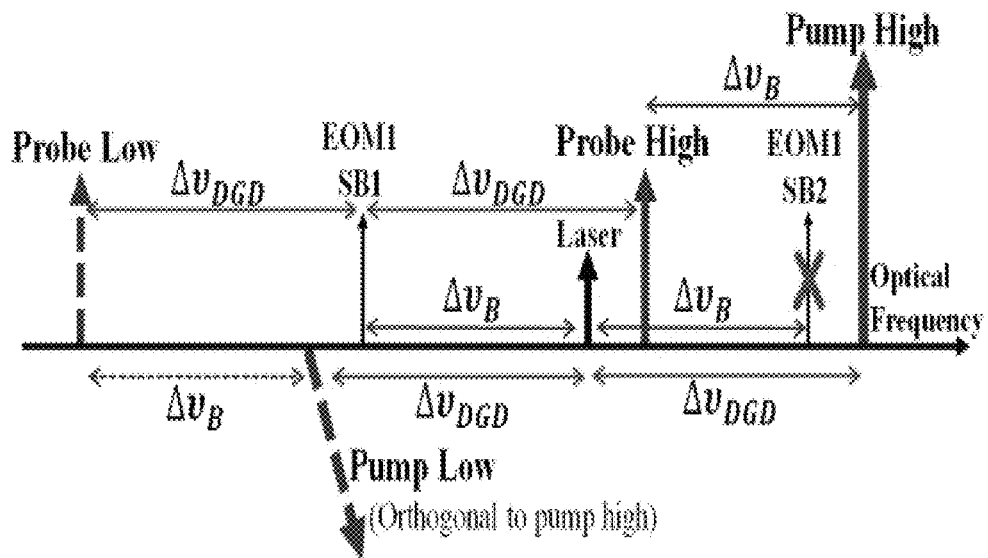
FIG. 1A is a diagram illustrating the signals applied to the optical fiber according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1(a) is a schematic block diagram illustrating a system in accordance with some embodiments of the present invention. In the system, two pairs of pulsed pump wave and counter-propagating CW probe wave are launched simultaneously into the FUT, and the common pump-probe frequency difference, $\Delta v_B$, can be scanned over a frequency range that encompasses the BGS and its possible/expected spectral shifts along the FUT. To eliminate the polarization fading problem, the two pump waves are launched into the FUT with orthogonal SOPs, whereas the two CW probe waves have the same SOP. Ignoring polarization mode dispersion (PMD) of the FUT (for dynamic sensing relatively short, of FUTs shorter than 1 km), the two pumps remain orthogonal while travelling along the fiber. Mimicking the sequential operation of the above mentioned polarization switch, but now in a simultaneous manner, the Brillouin interaction between the two orthogonal pumps and their corresponding probes ensures that the sum of the Brillouin amplified probes is polarization independent.

Figure 1B:
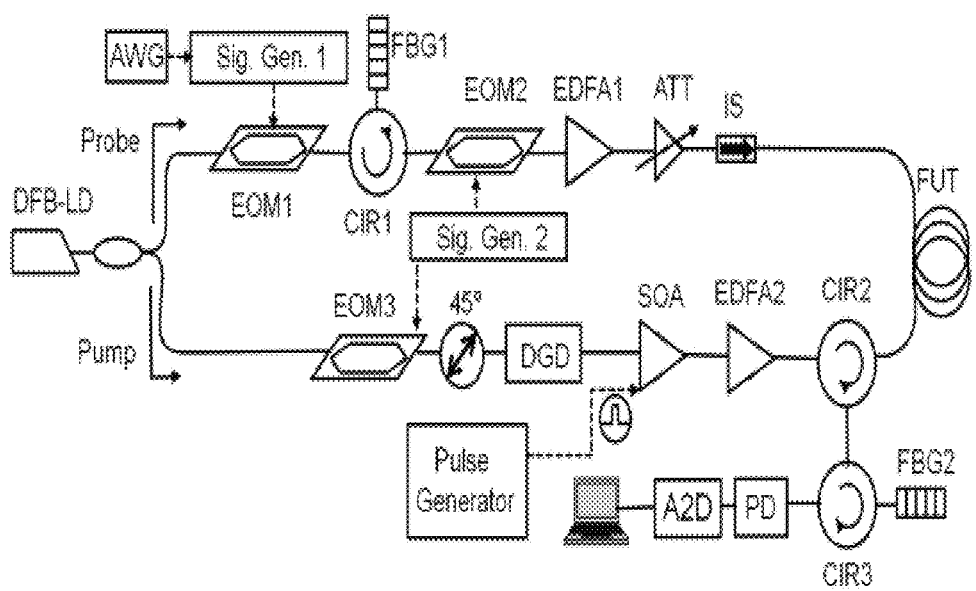
FIG. 1B is a block diagram illustrating the system according to some embodiments of the present invention.

FIG. 1(b) is a schematic diagram of an experimental setup implementing the system in accordance with some embodiments of the present invention. The output of a distributed feedback laser (DFB) diode is split into two optical branches. At the upper probe branch the optical modulator (EOM1), driven at frequency $\Delta v_B$ (EOM1, biased at minimum transmission), generates two sidebands, of which only the lower one, SB1 in FIG. 1(a) is kept (by FBG1). The lower sideband is fed into EOM2. A fixed frequency ($\Delta v_{DGD}$=12.5 GHz) RF signal simultaneously modulates EOM2 and EOM3 (both biased at minimum transmission) to generate the two (parallel) linearly polarized pump waves (lower branch, all components up to this point are polarization maintaining), as well as the two corresponding probes (upper branch), as seen in FIG. 1(a).

FIG. 1(a) illustrates two orthogonal pumps (denoted Pump High and Pump Low) possibly generated by the setup of FIG. 1(b) together with two co-polarized probes (denoted Probe High and Probe Low) which are down-shifted from their corresponding pumps by a tunable frequency difference, $\Delta v B$.

FIG. 1(b) illustrates the experimental setup: EOM: electro-optic modulator, EDFA: Erbium-doped fiber amplifier, CIR: circulator, IS: isolator, ATT: attenuator, FUT: fiber under test, FBG: fiber Bragg grating, PD: photodiode. SOA: Semiconductor optical amplifier, DGD: a device with a given Differential Group Delay (DGD), A2D: Fast analog to digital converter. The 45° splice ensures equal excitation of the two DGD principal axes (in the reported experiments a polarization controller was used instead of the 45° splice).

The two pumps, sharing the same linear polarization, then enter a $\Delta\tau$=20 ps DGD module, at an angle (45°) which equally excites the module two principal axes. Under this condition and recalling that the frequency separation of the two pumps is 25 GHz (=0.5/$\Delta\tau$), the two emerging pumps are orthogonally polarized. They are then pulsed by the Semiconductor Optical Amplifier (SOA), amplified by EDFA2 and launched into the FUT, while the two probes, amplified by EDFA1, enter the FUT from its other end. Finally, the two amplified probe waves are added up on the photodiode (PD).

Figure 2A:
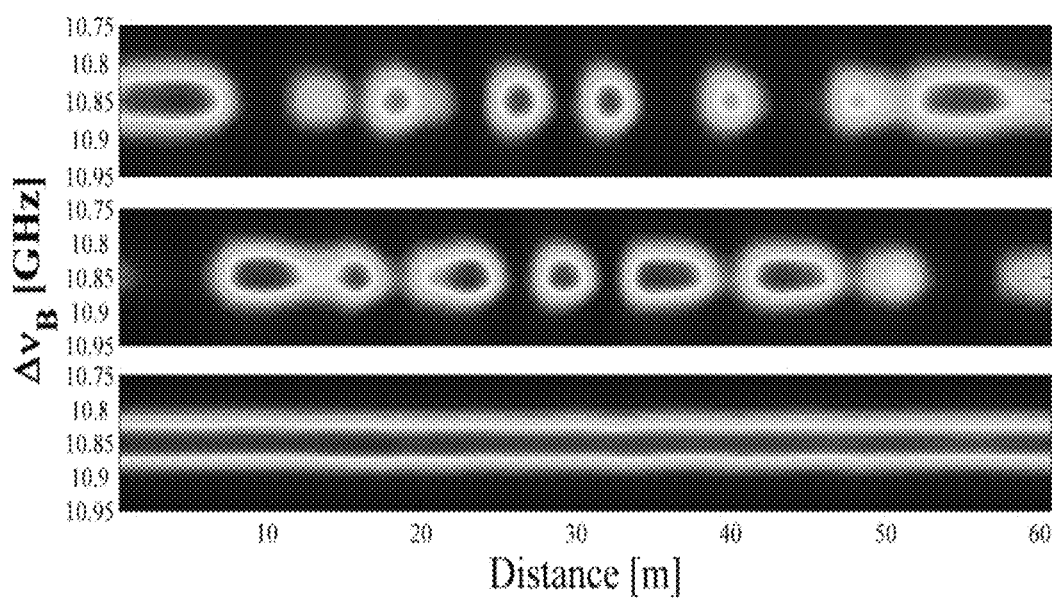
FIG. 2A is a diagram illustrating outputs of the measured Brillouin amplified signals according to some embodiments of the present invention.

FIG. 2(a) shows the BGS of a static 60 m single mode fiber (SMF) with a uniform BFS (10.85 GHz) using the method of in accordance with some embodiments of the present invention, comparing the results of three measurements using: (a) one pump-probe pair (as in classical BOTDA before scrambling); (b) the other pair; and (c) both pairs. Polarization fading is clearly seen in (a) and (b) but not in (c).

Figure 2B:
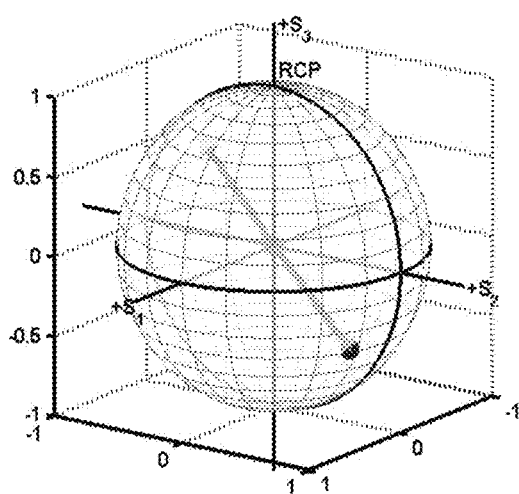
FIG. 2B is a mathematical diagram illustrating an aspect according to some embodiments of the present invention.

FIG. 2(b) illustrates BGS test fiber measured by only the high frequency pump and probe pair (pump high, probe high in FIG. 1(b)). (b) The BGS measured by the low frequency pump and probe pair, filling up the faded sections in (a). In (c) BGS measured simultaneously by both pairs as proposed herein. In (d) the two pumps are practically orthogonal: their tips on Poincare sphere subtend an angle of 176° (instead of) 180°).

Figure 3A:
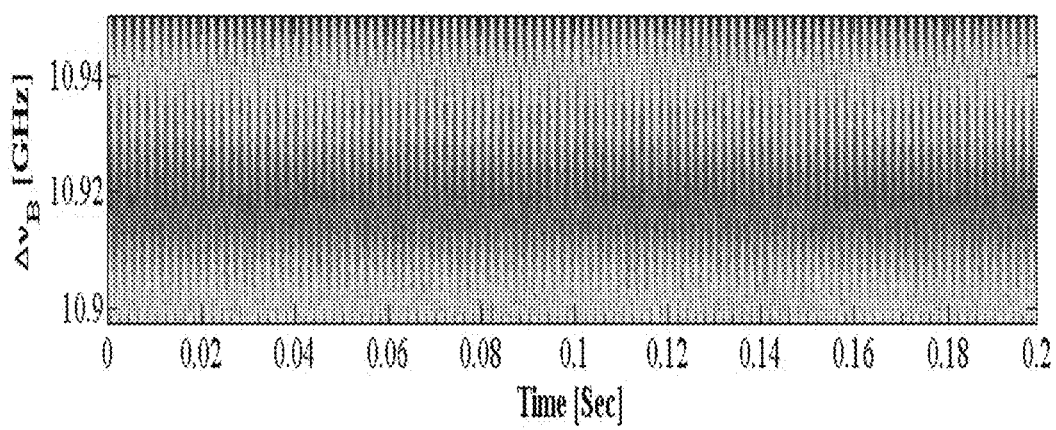
FIG. 3A is a diagram illustrating an aspect according to some embodiments of the present invention.
Figure 3B:
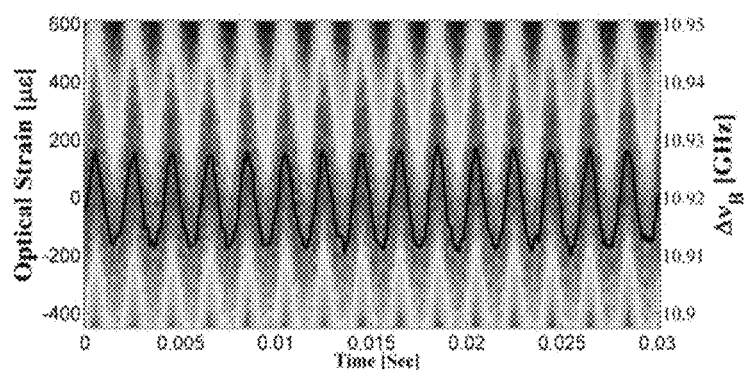
FIG. 3B is a diagram illustrating another aspect according to some embodiments of the present invention.

The optical fiber in accordance with the experiment carried herein includes 145 m of SMF, where the last 3.5 m could be dynamically stretched between a fixed point and a mechanical shaker. To demonstrate the ability of the method in accordance with some embodiments of the present invention to measure at the ultimate speed allowed by the fiber length (time of flight) and the number of scanning frequencies, 61 scanning frequencies were used, spaced by 1 MHz (dynamic range of 60 MHz/1200µε span) without averaging. Under these conditions, the ultimate acquisition speed is 11,300 full-FUT BGSs per second (2·108 [m/s]/(2·145 m)/61). Using a 15 ns pump pulse and measured by a 1 GSamples/sec scope, the results for the 3.5 m segment, which vibrated at 500 Hz (with a peak-to-peak amplitude of ~400µε), are shown in FIG. 3(a), which is comprised of 2260 BGSs (=0.2 s*11300). A zoomed-in view of the first 0.03 s appears in FIG. 3(b) together with a line connecting the peaks of the displayed BGSs (using parabolic fit). This line describes the time dependence of the BFS, namely the vibrating fiber segment strain. Using parabolic fit with the recorded SNR the BFS error is ±0.3 MHz/±6µε. For a continuous measurement of a dynamic event we used an 8 bit A/D PC card, feeding the acquired data directly to the PC disk. 71 scanning frequencies were used, spaced by 3 MHz (covering a 210 MHz/4200µε range), resulting in an ultimate acquisition speed is 9700 BGSs per second (using the same FUT). Due to A/D data-transfer limitations 6 averages had to be taken, with a final acquisition rate to 1.28 full-FUT BGSs/s.

Figure 4:
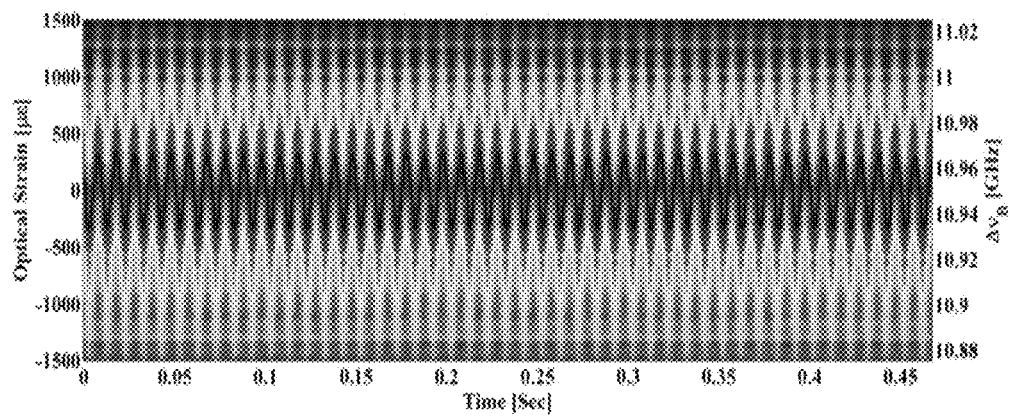
FIG. 4 is a diagram illustrating yet another aspect according to some embodiments of the present invention.

Results for the 3.5 m segment vibrations at 100 Hz (±350µε) are shown in FIG. 4. Here the BFS error was ±0.15 MHZ/±3µε.

Figure 5:
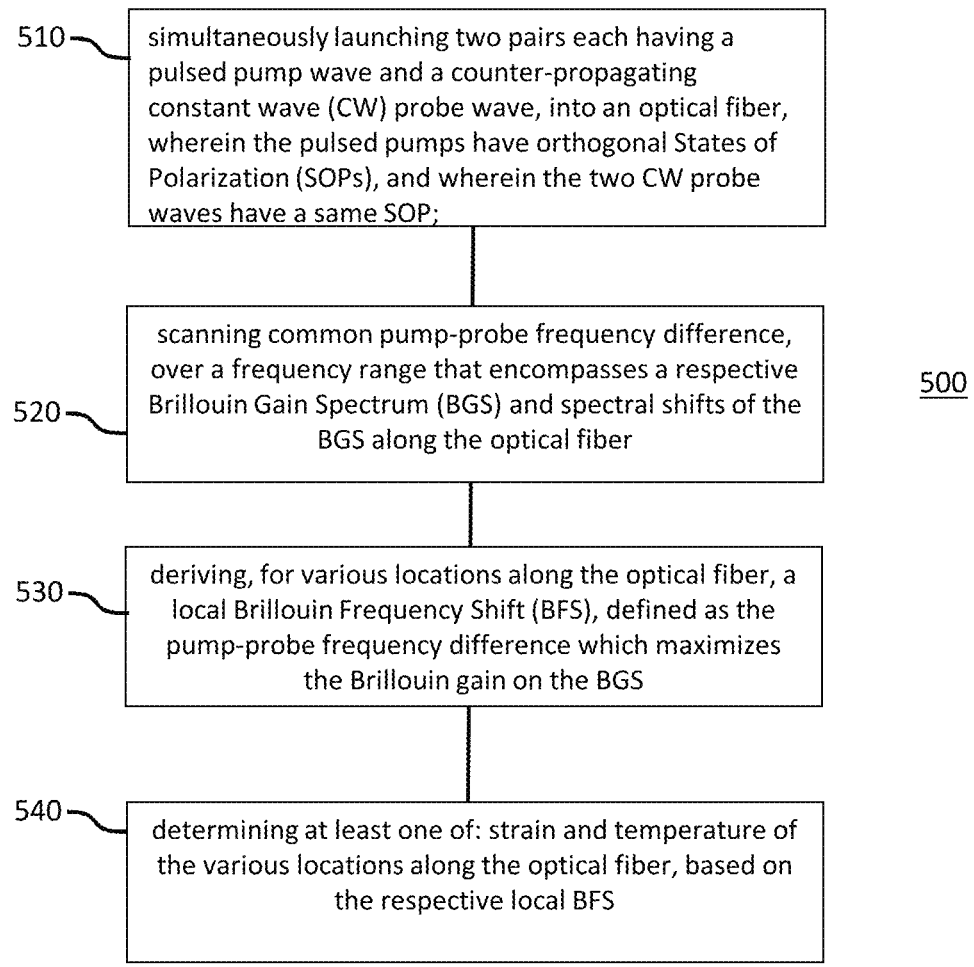
FIG. 5 is a high level flowchart illustrating a method according to some embodiments of the present invention.

FIG. 5 is a flowchart 500 summarizing the method in accordance with some embodiments of the present invention. The method may include: simultaneously launching two pairs each having a pulsed pump wave and a counter-propagating constant wave (CW) probe wave, into an optical fiber, wherein the pulsed pumps have orthogonal States of Polarization (SOPs), and wherein the two CW probe waves have a same SOP 510; scanning common pump-probe frequency difference, over a frequency range that encompasses a respective Brillouin Gain Spectrum (BGS) and spectral shifts of the BGS along the optical fiber 520; deriving, for various locations along the optical fiber, a local Brillouin Frequency Shift (BFS), defined as the pump-probe frequency difference which maximizes the Brillouin gain on the BGS 530; and determining at least one of: strain and temperature of the various locations along the optical fiber, based on the respective local BFS. 540.

Advantageously, some embodiments of the present invention can be used in sensing micro strains in dynamically changing environments such as aircrafts and other moving platforms. Additionally, some embodiments of the present invention are also useful in detecting such strains and temperature changes that occur in quasi static environments and over may kilometers such as along pipelines.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe some embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
   simultaneously launching two pairs of optical signals into an optical fiber, each pair comprising a pulsed pump wave and a counter-propagating constant wave (CW) probe wave, wherein the pulsed pumps have orthogonal States of Polarization (SOPs), and wherein the two CW probe waves have a same SOP;
   scanning common pump-probe frequency difference, over a frequency range that encompasses a respective Brillouin Gain Spectrum (BGS) and current and expected spectral shifts of the BGS in a plurality of locations along the optical fiber;
   deriving, a local Brillouin Frequency Shift (BFS), in said plurality of locations along the optical fiber, wherein said local BFS is the pump-probe frequency difference which maximizes the Brillouin gain on the BGS;
   determining strain and/or temperature in said plurality of locations along the optical fiber, based on the respective local BFS; and
   evaluating dynamic structural changes to a structure to which the optical fiber is attached thereto, or planted therein, based on the determined strain or temperature.

2. The method according to claim 1, wherein the scanning, the deriving, and the determining are repeated sufficiently fast so that the optical fiber is sampled throughout its length allowing a dynamic sensing of strain and temperature.

3. A system comprising:
   at least one light source;
   an optical fiber;
   a controller configured to instruct the light source to simultaneously launch two pairs of optical signals into said optical fiber, each pair having a pulsed pump wave and a counter-propagating constant wave (CW) probe wave, wherein the pulsed pumps have orthogonal States of Polarization (SOPs), and wherein the two CW probe waves have a same SOP;
   a sensor configured to measure outputs of the optical fiber; and
   a computer processor configured to receive outputs of the optical sensor and:
      scan common pump-probe frequency difference, over a frequency range that encompasses a respective Brillouin Gain Spectrum (BGS) and current and expected spectral shifts of the BGS in a plurality of locations along the optical fiber;
      derive, the local Brillouin Frequency Shift (BFS), in said plurality of locations along the optical fiber, which is defined as the pump-probe frequency difference which maximizes the CW probe Brillouin gain; and
      determine strain and/or temperature in said plurality of locations along the optical fiber, based on the respective local BFS,
      wherein the system is further configured to evaluate dynamic structural changes to a structure to which the optical fiber is attached thereto, or planted therein, based on the determined strain or temperature.

4. The system according to claim 3, wherein the scanning, the deriving, and the determining are repeated sufficiently fast so that the optical fiber is sampled throughout its length allowing a dynamic sensing of strain and temperature.

* * * * *